(12) United States Patent
Genkin et al.

(10) Patent No.: US 8,496,908 B1
(45) Date of Patent: Jul. 30, 2013

(54) HYDROGEN PRODUCTION WITH $CO_2$ CAPTURE

(71) Applicant: Air Products and Chemicals, Inc., Allentown, PA (US)

(72) Inventors: Eugene S. Genkin, Allentown, PA (US); Kevin Boyle Fogash, Wescosville, PA (US); Kathleen M. Dent, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/655,991

(22) Filed: Oct. 19, 2012

(30) Foreign Application Priority Data

Jun. 12, 2012 (EP) .................................... 12171700

(51) Int. Cl.
*C01B 3/38* (2006.01)
*F23C 9/00* (2006.01)
*F23J 15/00* (2006.01)
*F23M 5/00* (2006.01)
*B01D 53/86* (2006.01)

(52) U.S. Cl.
USPC .......................... 423/651; 423/437.1; 423/650

(58) Field of Classification Search
None
See application file for complete search history.

(56) References Cited

U.S. PATENT DOCUMENTS

| 6,113,874 A * | 9/2000 | Kobayashi ..................... 423/650 |
| 6,136,279 A | 10/2000 | Stahl |
| 2003/0031618 A1 | 2/2003 | Minkkinen |
| 2003/0110693 A1 | 6/2003 | Drnevich et al. |
| 2005/0210881 A1* | 9/2005 | Balan et al. ...................... 60/780 |
| 2005/0257685 A1* | 11/2005 | Baksh et al. ....................... 95/96 |
| 2009/0232729 A1 | 9/2009 | Genkin et al. |
| 2010/0081098 A1* | 4/2010 | D'Agostini et al. .............. 431/5 |
| 2010/0252776 A1* | 10/2010 | Farmayan et al. ....... 252/186.24 |
| 2011/0067306 A1* | 3/2011 | Balmas et al. ................ 48/62 R |
| 2011/0085967 A1 | 4/2011 | Raybold et al. |
| 2011/0146991 A1 | 6/2011 | Palamara et al. |
| 2011/0277500 A1* | 11/2011 | Bauer et al. ..................... 62/630 |

FOREIGN PATENT DOCUMENTS

| WO | 2008/147860 A1 | 12/2008 |
| WO | 2011/028322 A1 | 3/2011 |

OTHER PUBLICATIONS

Plant-Wide NOx Reduction Strategies C. Baukal, D. Waibel, and T. Webster Proceedings of the Twenty-Eight Industrial Energy Technology Conference, New Orleans, LA May 9-12, 2006 ESL-IE-06-05-44.*

(Continued)

*Primary Examiner* — Melvin C Mayes
*Assistant Examiner* — Douglas Call
(74) *Attorney, Agent, or Firm* — Bryan C. Hoke, Jr.

(57) ABSTRACT

A steam methane reforming process for producing a hydrogen product while capturing $CO_2$ from the process. Steam and a hydrocarbon are reformed in a catalytic reformer. The reformate is separated by pressure swing adsorption to form the hydrogen product and a PSA tail gas. The tail gas is returned to the reformer as a fuel. The fuel is combusted with synthetic air where the synthetic air is formed by combining a portion of the flue gas with industrial grade oxygen. The flue gas consists essentially of $CO_2$ and $H_2O$. The $H_2O$ is condensed out of another portion of the flue gas to form an essentially pure $CO_2$ product.

20 Claims, 1 Drawing Sheet

OTHER PUBLICATIONS

Allam, Rodney J., "Oxyfuel Conversion of Refinery Process Equipment Utilising Flue Gas recycle for CO2 Capture,", presented at the 7th IEA Greenhouse Gas Technologies Conference, Sep. 5-9, 2004.

Wilkinson, Michael B., "Oxyfuel Conversion of Heater and Boilers for CO2 Capture", 2nd National Conference on Carbon Sequestration, May 5-8, 2003, Washington, D.C.

Allam, Rodney J., "The Oxyfuel Baseline: Revamping Heaters and Boilers to Oxyfiring by Cryogenic Air Separation and Flue Gas Recycle", Chapter 26, Carbon Dioxide Capture for Storage in Deep Geologic Formations, vol. 1, D.C. Thomas and S. M. Benson (Eds.), Elsevier, 2005.

* cited by examiner

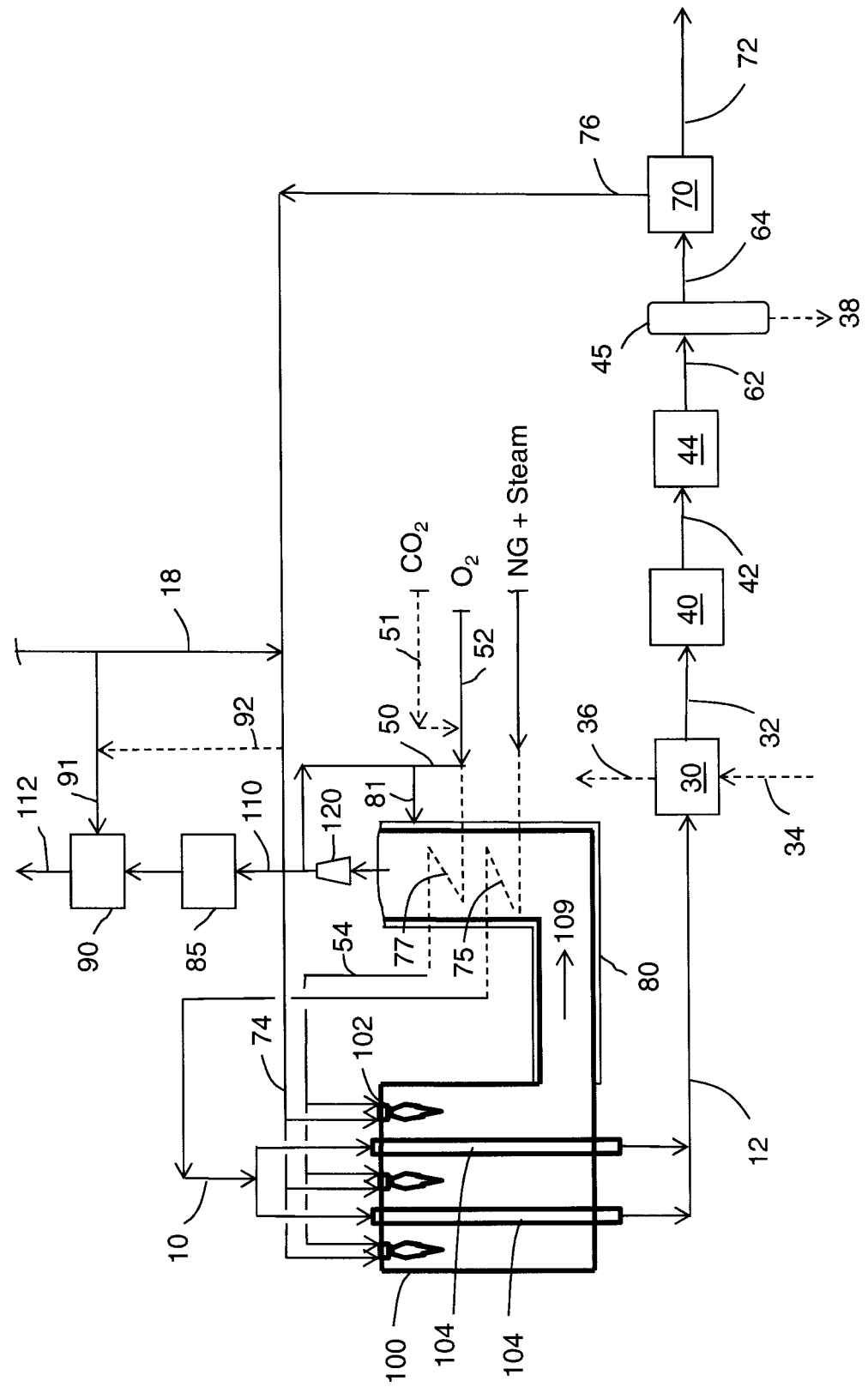

US 8,496,908 B1

HYDROGEN PRODUCTION WITH CO$_2$ CAPTURE

CROSS-REFERENCE TO RELATED APPLICATIONS

This application claims priority to European Patent Application EP12171700.3, filed Jun. 12, 2012, incorporated herein by reference.

BACKGROUND

There is growing pressure to reduce carbon dioxide emissions from industrial processes. The steam methane reforming (SMR) process, which is used in the production of ammonia, hydrogen, methanol, syngas, etc., is one of the significant contributors to CO$_2$ emissions. A large hydrogen production plant may produce up to 900,000 metric tons of carbon dioxide per year, thus it may be considered a significant source of carbon dioxide.

In Europe, Canada, and California, carbon dioxide reduction regulations are being phased in gradually. This means that greenhouse gas (GHG) legislation remains a key consideration in future projects. The current understanding on this issue is that new plants will have to plan for carbon dioxide capture but may not be required to install and operate such systems at the project on-stream date. Therefore, industry desires a flexible carbon dioxide capture ready design that may be implemented when needed.

Steam methane reformers have two primary sources of carbon dioxide with 50 to 65% produced at high pressure along with the synthesis gas as a by-product of the steam reforming and shift reactions. The remaining CO$_2$ is generated by combustion of a fuel in the reformer furnace at about ambient pressure. For synthesis gas producing processes that include a methanator, CO$_2$ from the high pressure synthesis gas stream is selectively removed with an acid gas removal system such as an MEA, aMDEA, Benfield, etc. so that the CO$_2$ is captured from the process gas as part of the overall process.

A portion of the CO$_2$ emissions can also be captured from steam methane reformer designed to produce high purity H$_2$ product. An acid gas removal system may be installed to remove CO$_2$ in the process gas upstream of the pressure swing adsorber (PSA) unit. The PSA is used to produce the H$_2$ product stream and a by-product tail gas stream. This option can capture about 50 to 65% of the overall carbon emissions generated from the steam methane reformer. The advantage of having the acid gas removal system on the process gas stream is that it operates at high partial pressure of CO$_2$ in the CO$_2$ removal system and requires relatively low energy for CO$_2$ stripping. In many cases, it is possible to utilize a significant portion of the waste heat remaining in the process gas stream cooling train without the need to import additional energy in the form of low pressure steam. The disadvantage of installing an acid gas removal system on the high pressure process side for CO$_2$ removal is that it requires a major retrofit effort, significant down time, and is disruptive to the current plant operation.

Additional CO$_2$ can be captured if the reformer furnace is retrofitted or designed with a post-combustion CO$_2$ recovery system such as Fluor's Econamine FG Plus$^{SM}$, or Mitsubishi's KM CDR Process®. These systems remove CO$_2$ from the flue gas from the reformer furnace stack. The flue gas stream is at a much lower pressure than the process gas stream.

A facility with CO$_2$ recovery in the flue gas would be able to capture about 90% of the overall CO$_2$ emissions from the facility. This process, if applied as a retrofit, would have minimum impact on design or operation of the existing facility and would be a "bolt-on" technology.

However, CO$_2$ removal from low pressure flue gas has significant energy requirements per unit of CO$_2$ removed. High energy usage to remove CO$_2$ typically requires additional steam import from an outside source or use of a portion of the high pressure export steam produced by the reformer facility for CO$_2$ stripping. Both options result in significant efficiency penalties and additional operational costs.

Industry desires to produce hydrogen by steam-hydrocarbon reforming while capturing carbon dioxide thereby decreasing or eliminating carbon dioxide emissions.

Industry desires to capture CO$_2$ from industrial processes for sequestration, enhanced oil recovery, or other uses.

Industry desires high purity CO$_2$. Industry desires a CO$_2$ purity in the CO$_2$ product stream of at least 95 mole % on a dry basis.

Industry desires to reduce greenhouse gas emissions, particularly CO$_2$ emissions.

Industry desires to capture CO$_2$ from industrial processes using proven unit operations and equipment.

Industry desires energy efficient and cost-effective retrofit solutions for capturing CO$_2$ from existing facilities.

Industry desires an energy efficient large-scale hydrogen production process with decreased carbon dioxide emissions compared to conventional processes.

These and other desires of industry are addressed by the present process.

BRIEF SUMMARY

The present invention relates to a process for producing a H$_2$ product gas and a CO$_2$ product gas. There are several aspects of the process as outlined below.

Aspect 1. A process for producing a H$_2$ product gas and a CO$_2$ product gas, the process comprising:

introducing reactants comprising steam and methane into a plurality of catalyst-containing reformer tubes in a radiant section of a reformer furnace, reacting the reactants in the presence of a reforming catalyst inside the plurality of catalyst-containing reformer tubes under reaction conditions sufficient to form a reformate comprising H$_2$, CO and steam, and withdrawing the reformate from the plurality of catalyst-containing reformer tubes, wherein the reformer furnace has the radiant section and a convection section, wherein the radiant section contains the plurality of catalyst-containing reformer tubes and the convection section contains heat exchange tubes;

introducing one or more fuel gases and an oxidant gas mixture into the radiant section of the reformer furnace external to the plurality of catalyst-containing reformer tubes, wherein the oxidant gas mixture comprises 20 volume % to 35 volume % oxygen on a wet basis, combusting the one or more fuel gases with the oxygen in the oxidant gas mixture in the radiant section of the reformer furnace external to the plurality of catalyst-containing reformer tubes thereby forming a combustion product gas and supplying energy for reacting the reactants inside the plurality of catalyst-containing reformer tubes, passing the combustion product gas from the radiant section of the reformer to the convection section of the reformer, and withdrawing the combustion product gas from the convection section of the reformer furnace;

recycling a first portion of the combustion product gas withdrawn from the convection section of the reformer furnace to the radiant section of the reformer furnace in the oxidant gas mixture, wherein 40 to 60% on a mass flow rate basis, of the combustion product gas withdrawn from the convection section of the reformer furnace is recycled as the first portion of the combustion product gas;

reacting residual $O_2$ in a second portion of the combustion product gas with at least one of $H_2$ and $CH_4$ in the presence of a catalyst thereby decreasing the $O_2$ concentration in the second portion of the combustion product gas to below 10 ppmv;

removing $H_2O$ from the second portion of the combustion product gas thereby forming the $CO_2$ product gas;

recovering heat from the reformate from the plurality of catalyst-containing reformer tubes thereby cooling the reformate;

reacting the cooled reformate in the presence of a shift catalyst under reaction conditions sufficient to shift the reformate to form additional $H_2$ in the reformate;

recovering heat from the shifted reformate thereby cooling the shifted reformate;

removing $H_2O$ from the shifted reformate to form a water-depleted reformate comprising $H_2$ and secondary gas components; and separating the water-depleted reformate in a plurality of at least 3 pressure swing adsorption beds, each adsorption bed containing an adsorbent selective for the secondary gas components thereby forming a $H_2$ product and a pressure swing adsorption tail gas;

wherein the one or more fuel gases comprise at least a portion of the pressure swing adsorption tail gas; and wherein, to prevent leakage of air into the convection section, a third portion of the combustion product gas is recycled to the convection section of the reformer furnace by infiltration through one or more convection section walls and/or the one or more fuel gases are combusted with the oxygen in the oxidant gas mixture in the radiant section of the reformer furnace external to the plurality of catalyst-containing reformer tubes at a pressure ranging from 102.5 kPa to 116.3 kPa (absolute) thereby forming the combustion product gas and supplying energy for reacting the reactants inside the plurality of the catalyst-containing reformer tubes.

Aspect 2. A process for producing a $H_2$ product gas and a $CO_2$ product gas, the process comprising:

introducing reactants comprising steam and methane into a plurality of catalyst-containing reformer tubes in a radiant section of a reformer furnace, reacting the reactants in the presence of a reforming catalyst inside the plurality of catalyst-containing reformer tubes under reaction conditions sufficient to form a reformate comprising $H_2$, CO and steam, and withdrawing the reformate from the plurality of catalyst-containing reformer tubes, wherein the reformer furnace has the radiant section and a convection section, wherein the radiant section contains the plurality of catalyst-containing reformer tubes and the convection section contains heat exchange tubes;

introducing one or more fuel gases and an oxidant gas mixture into the radiant section of the reformer furnace external to the plurality of catalyst-containing reformer tubes, wherein the oxidant gas mixture comprises 20 volume % to 35 volume % oxygen on a wet basis, combusting the one or more fuel gases with the oxygen in the oxidant gas mixture in the radiant section of the reformer furnace external to the plurality of catalyst-containing reformer tubes thereby forming a combustion product gas and supplying energy for reacting the reactants inside the plurality of catalyst-containing reformer tubes, passing the combustion product gas from the radiant section of the reformer to the convection section of the reformer, and withdrawing the combustion product gas from the convection section of the reformer furnace;

recycling a first portion of the combustion product gas withdrawn from the convection section of the reformer furnace to the radiant section of the reformer furnace in the oxidant gas mixture, wherein 40 to 60% on a mass flow rate basis, of the combustion product gas withdrawn from the convection section of the reformer furnace is recycled as the first portion of the combustion product gas;

reacting residual $O_2$ in a second portion of the combustion product gas with at least one of $H_2$ and $CH_4$ in the presence of a catalyst thereby decreasing the $O_2$ concentration in the second portion of the combustion product gas to below 10 ppmv;

removing $H_2O$ from the second portion of the combustion product gas thereby forming the $CO_2$ product gas;

recycling a third portion of the combustion product gas to the convection section of the reformer furnace by infiltration through one or more convection section walls;

recovering heat from the reformate from the plurality of catalyst-containing reformer tubes thereby cooling the reformate;

reacting the cooled reformate in the presence of a shift catalyst under reaction conditions sufficient to shift the reformate to form additional $H_2$ in the reformate;

recovering heat from the shifted reformate thereby cooling the shifted reformate;

removing $H_2O$ from the shifted reformate to form a water-depleted reformate comprising $H_2$ and secondary gas components; and separating the water-depleted reformate in a plurality of at least 3 pressure swing adsorption beds, each adsorption bed containing an adsorbent selective for the secondary gas components thereby forming a $H_2$ product and a pressure swing adsorption tail gas;

wherein the one or more fuel gases comprise at least a portion of the pressure swing adsorption tail gas.

Aspect 3. A process for producing a $H_2$ product gas and a $CO_2$ product gas, the process comprising:

introducing reactants comprising steam and methane into a plurality of catalyst-containing reformer tubes in a radiant section of a reformer furnace, reacting the reactants in the presence of a reforming catalyst inside the plurality of catalyst-containing reformer tubes under reaction conditions sufficient to form a reformate comprising $H_2$, CO, and steam, and withdrawing the reformate from the plurality of catalyst-containing reformer tubes, wherein the reformer furnace has the radiant section and a convection section, wherein the radiant section contains the plurality of catalyst-containing reformer tubes and the convection section contains heat exchange tubes;

introducing one or more fuel gases and an oxidant gas mixture into the radiant section of the reformer furnace external to the plurality of catalyst-containing reformer tubes, wherein the oxidant gas mixture comprises 20 volume % to 35 volume % oxygen on a wet basis, combusting the one or more fuel gases with the oxygen in the oxidant gas mixture in the radiant section of the reformer furnace external to the plurality of catalyst-containing reformer tubes at a pressure ranging from 102.5 kPa to 116.3 kPa (absolute) thereby forming a combustion product gas and supplying energy for reacting the reactants inside the plurality of catalyst-containing reformer tubes, passing the combustion product gas from the radiant section of the reformer to the convection section of the reformer, and withdrawing the combustion product gas from the convection section of the reformer furnace;

recycling a first portion of the combustion product gas withdrawn from the convection section of the reformer furnace to the radiant section of the reformer furnace in the oxidant gas mixture, wherein 40 to 60%, on a mass flow rate basis, of the combustion product gas withdrawn from the convection section of the reformer furnace is recycled as the first portion of the combustion product gas;

reacting residual $O_2$ in a second portion of the combustion product gas with at least one of $H_2$ and $CH_4$ in the presence of a catalyst thereby decreasing the $O_2$ concentration in the second portion of the combustion product gas to below 10 ppmv;

removing $H_2O$ from the second portion of the combustion product gas thereby forming the $CO_2$ product gas;

recovering heat from the reformate from the plurality of catalyst-containing reformer tubes thereby cooling the reformate;

reacting the cooled reformate in the presence of a shift catalyst under reaction conditions sufficient to shift the reformate to form additional $H_2$ in the reformate;

recovering heat from the shifted reformate thereby cooling the shifted reformate;

removing $H_2O$ from the shifted reformate to form a water-depleted reformate comprising $H_2$ and secondary gas components; and separating the water-depleted reformate in a plurality of at least 3 pressure swing adsorption beds, each adsorption bed containing an adsorbent selective for the secondary gas components thereby forming a $H_2$ product and a pressure swing adsorption tail gas;

wherein the one or more fuel gases comprise at least a portion of the pressure swing adsorption tail gas.

Aspect 4. The process of any one of the preceding aspects wherein the one or more fuel gases comprise a supplemental fuel.

Aspect 5. The process of any one of aspects 1, 2 or 4 wherein the step of recycling the third portion of the combustion product gas to the convection section of the reformer comprises passing the third portion of the combustion product gas to a space between a jacket and the one or more convection section walls for infiltration of the third portion of the combustion product gas through openings in the one or more convection section walls.

Aspect 6. The process of any one of aspects 1 to 4 further comprising at least one of:

blending the first portion of the combustion product gas with industrial grade oxygen to form the oxidant gas mixture; and/or recovering heat from the combustion product gas in the convection section by indirect heat exchange between the combustion product gas and the oxidant gas mixture prior to introducing the oxidant gas mixture into the radiant section of the reformer furnace.

Aspect 7. The process of any one of aspects 1 to 6 further comprising recovering heat from the combustion product gas in the convection section by indirect heat exchange between the combustion product gas and the reactants.

Aspect 8. The process of any one of aspects 1 to 7 further comprising:

introducing steam and a hydrocarbon feed into a first reactor, reacting the steam and the hydrocarbon feed in the presence of a second reforming catalyst under reaction conditions sufficient to react a portion of the steam and the hydrocarbon feed, and withdrawing an effluent from the first reactor; and recovering heat from the combustion product gas in the convection section by indirect heat exchange between the combustion product gas and the effluent from the first reactor thereby heating the effluent from the first reactor;

wherein the reactants introduced into the plurality of catalyst-containing reformer tubes comprise the heated effluent from the first reactor.

Aspect 9. The process of any one of aspects 1 to 8 further comprising:

passing a hydrocarbon feedstock to a nitrogen rejection unit to remove nitrogen from the hydrocarbon feedstock thereby forming the hydrocarbon feed introduced into the first reactor.

Aspect 10. The process of any one of aspects 1 to 9 further comprising:

passing a hydrocarbon feedstock to a nitrogen rejection unit to remove nitrogen from the hydrocarbon feedstock;

blending steam with the nitrogen-depleted hydrocarbon feedstock to form the reactants comprising steam and methane introduced into the plurality of catalyst-containing tubes.

Aspect 11. The process of any one of aspects 1 to 10 further comprising:

passing all or only a portion of the pressure swing adsorption tail gas to a nitrogen rejection unit to remove nitrogen from the pressure swing adsorption tail gas prior to introducing this pressure swing adsorption tail gas as the one or more fuel gases or as at least a portion of the one or more fuel gases into the radiant section of the reformer furnace.

Aspect 12. The process of any one of aspects 1 to 11 wherein the oxidant gas mixture further comprises imported $CO_2$.

Aspect 13. The process of any one of aspects 1 to 12 wherein the oxidant gas mixture is introduced at an oxygen molar flow rate that is 1 to 5% in excess of that required for complete combustion of the one or more fuel gases.

Aspect 14. The process of aspect 10 wherein the reformate is cooled by heat exchange with feed water thereby forming the steam from the feed water.

Aspect 15. The process of any one of aspects 1 to 14 wherein the at least one of $H_2$ and $CH_4$ for reacting the residual $O_2$ in the second portion of the combustion product gas is provided by at least one of the $H_2$ product, a portion of the pressure swing adsorption tail gas, and a supplemental fuel.

Aspect 16. The process of any one of the aspects 1 to 15 wherein the oxidant gas mixture comprises 20 volume % to 35 volume % oxygen and 15 volume % to 50 volume % $CO_2$ on a wet basis, wherein at least essentially all of the $CO_2$ of the oxidant gas mixture, namely 95% or more, is delivered by the first portion of the combustion product gas. Imported $CO_2$ may be added to make up for 100%.

Aspect 17. The process of any one of the aspects 1 to 16 wherein the oxidant gas mixture contains less than 5 volume % inerts including $N_2$ and any noble gas.

BRIEF DESCRIPTION OF SEVERAL VIEWS OF THE DRAWINGS

The FIGURE illustrates an exemplary process flow diagram for the process.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The present invention relates to a process for producing a $H_2$ product gas and a $CO_2$ product gas and is described below with reference to the FIGURE.

The process comprises introducing reactants 10 comprising steam and methane into a plurality of catalyst-containing reformer tubes 104 in the radiant section of reformer furnace 100. The reformer furnace 100 has a radiant section and a convection section. The radiant section contains the plurality of catalyst-containing reformer tubes and the convection section contains heat exchange tubes for recovering heat from combustion product gases. In the radiant section of the reformer, heat transfer to the reformer tubes is predominately by radiant heat transfer from combustion flames, whereas in the convection section, heat transfer to the heat exchange tube is predominately by convective heat transfer from the combustion product gases.

The reactants may be a mixture of natural gas and steam. The reactants may comprise other hydrocarbons in addition to methane, for example, C2-C5 hydrocarbons. The reactants may be formed from a hydrocarbon feedstock (e.g. natural gas) where nitrogen has been removed in a nitrogen rejection unit. The nitrogen-depleted feedstock may be blended with steam to form the reactants. The reactants may be a "prereformed" mixture as discussed later.

The nitrogen rejection unit may be cryogenic or sorption based. The nitrogen rejection unit may be any nitrogen rejection unit known in the art.

The reactants 10 are reacted in the presence of a reforming catalyst inside the plurality of catalyst-containing reformer tubes 104 under reaction conditions sufficient to form a reformate 12 comprising $H_2$, CO, and steam. The reforming catalyst may be any suitable catalyst known in the art that catalyzes the reforming reaction, for example, a nickel-based catalyst. The reaction conditions may include a temperature ranging from 740° C. to 960° C. and a pressure ranging from 1.2 MPa to 4.0 MPa. Reformate 12 is withdrawn from the plurality of catalyst-containing reformer tubes 104.

The process comprises introducing one or more fuel gases 74 and an oxidant gas mixture 54 through burners 102 into the radiant section of the reformer furnace 100 external to the plurality of catalyst-containing reformer tubes 104. The oxidant gas mixture 54 comprises 20 volume % to 35 volume % oxygen and 15 volume % to 50 volume % $CO_2$ on a wet basis. The oxidant gas mixture may also comprise steam in an amount of 15 volume % to 40 volume %. The oxidant gas mixture preferably contains less than 5 volume % inerts ($N_2$ and Ar combined). Such an oxidant gas mixture may be termed "synthetic air". The one or more fuel gases 74 are combusted with the oxygen in the oxidant gas mixture 54 in the radiant section of the reformer furnace external to the plurality of catalyst-containing reformer tubes 104. The combustion of the one or more fuel gases forms combustion product gases 109 and supplies energy for reacting the reactants 10 inside the plurality of catalyst-containing reformer tubes 104. Combustion product gases 109 from the radiant section of the reformer are passed to the convection section of the reformer, and are withdrawn from the convection section of the reformer furnace 100.

The combustion product gas 109 may be pulled from the convection section and compressed by a blower fan 120.

A first portion 50 of the combustion product gas withdrawn from the convection section of the reformer furnace is recycled to the radiant section of the reformer furnace in the oxidant gas mixture 54. On a mass flow rate basis, 40 to 60% of the combustion product gas withdrawn from the convection section of the reformer furnace is recycled as the first portion of the combustion product gas.

The oxidant gas mixture 54 may be formed by blending the first portion of the combustion product gas with industrial grade oxygen 52. As used herein, industrial grade oxygen means an oxygen-containing gas having an oxygen concentration of 90 vol. % to 100 vol. %. Industrial grade oxygen may be made by any suitable air separation process, for example, cryogenic air separation or air separation by pressure swing adsorption. The advantage of an oxidant gas mixture having 20 volume % to 35 volume % oxygen is that the heat transfer characteristics will be similar to that of an air fuel system. In case of an oxy-fuel process where the oxidant gas has 90 volume % to 100 volume %, the flame temperatures would be much higher than for an air-fuel or synthetic air-fuel process, which would likely require significant modifications to the reformer radiant section design.

The oxidant gas mixture may comprise imported $CO_2$ 51. "Imported $CO_2$" is $CO_2$ from a source other than the reformer, for example, another process or $CO_2$ pipeline.

The oxidant gas mixture may be introduced at an oxygen molar flow rate that is 1 to 5% in excess of that required for complete combustion of the one or more fuel gases (i.e. 1 to 5 percent excess oxygen). "Percent oxygen" is the actual amount of oxygen in the oxidant gas mixture supplied to a combustion process, expressed as a percentage of the amount theoretically required for complete combustion, i.e. the stoichiometric amount. "Percent excess oxygen" is the percentage of oxygen supplied in excess of that required for complete combustion.

The oxygen flow rate may be controlled to provide conditions close to stoichiometric combustion in the present process in order to reduce the amount of oxygen in the combustion products.

$CO_2$ product gas is formed from a second portion 110 of the combustion product gas. Residual $O_2$ in the second portion 110 of the combustion product gas reacted with at least one of $H_2$ and $CH_4$ in the presence of a catalyst in deoxidation unit 90 thereby decreasing the $O_2$ concentration in the second portion of the combustion product gas to below 10 ppmv. Stream 91 provides the $H_2$ and/or $CH_4$ to the deoxidation unit 90. The second portion 110 may be cooled in heat exchanger 85 prior to deoxidation. The $H_2$ may be taken from product $H_2$ 72. $CH_4$ may be from natural gas, for example from the supplemental fuel stream 18. $H_2$ and/or $CH_4$ may be from a portion 92 of the pressure swing adsorption tail gas 76. Any suitable catalyst known in the art for deoxidation may be used. The $O_2$ concentration after reacting the $O_2$ in the second portion may be 5 to 10 ppmv. $H_2O$ from the second portion 110 of the combustion product gas is removed thereby forming the $CO_2$ product gas 112. The $CO_2$ product gas may be sequestered, used for enhanced oil recovery, introduced into a $CO_2$ pipeline, or otherwise used.

The present process gives the surprising result that $CO_2$ can be separated in the process without the need for any separate $CO_2$ removal system. Both the process and the flue gas $CO_2$ are captured in one place and the water component is easily removed by condensation.

For reforming furnaces designed with an induced draft fan, both the radiant and convective sections operate under negative pressure (<1 atm. pressure absolute). The pressure draft increases from a differential pressure of 50 Pa to 250 Pa gauge (0.2" to 1"$H_2O$ vacuum) in the radiant section to a differential pressure of 6230 Pa to 8720 Pa gauge (25" to 35" $H_2O$ vacuum) at the suction of the induce draft fan in the convection section. As a result of this difference in pressure in the radiant and convective sections of the reformer, the permeate flow of ambient air for most reformers is negligible in the radiant section and much higher in the convection section. The permeation of air into the convection section is particularly higher near the induced draft fan where there is the greatest negative pressure. For prior art reformers with air-fuel combustion, the air leakage into the convection section has no practical impact on furnace operation. However, for the present process, the leakage of ambient air can substantially dilute the $CO_2$-rich combustion product gas to the level that removal of $N_2$ due to the ambient air leakage into the reformer is required.

It is expensive and technically challenging to provide mechanical sealing of the convection section ducting, especially for large scale reformer furnaces as they require specially designed flanges, ports, maintenance doors, etc.

In a preferred embodiment, a third portion 81 of the combustion product gas is recycled to the convection section of the reformer furnace by infiltration through one or more convection section walls. The third portion of the combustion product gas may blanket or shield one or more of the walls of the convection section or only surface areas of these walls which are critical with respect to penetration of ambient air. The third portion of the combustion product gas may be passed to a space between a jacket 80 and the one or more convection section walls for infiltration of the third portion of the combustion product gas through one or more openings in the one or more convection section walls. A jacket can be any ductwork, enclosure, bag, shroud, sack, and the like for containing the third portion of the combustion product gas and facilitating infiltration of the combustion product gas through openings in the convection section walls and into the convection section of the reformer.

Recycling the third portion 81 of the combustion product gas acts to prevent leakage of air into the convection section of the reformer furnace. Air infiltration, which is normal for prior art reformer furnaces, would diminish the purity of $CO_2$ product in the present process. The ingress of oxygen and nitrogen into the convection section due to air leakage may make the $CO_2$ unsuitable for use.

In an alternative embodiment, the one or more fuel gases and the oxidant gas mixture may be combusted in the radiant section of the reformer furnace at a pressure ranging from 102.5 kPa to 116.3 kPa (absolute) to limit air infiltration without recycling a third portion of the combustion product gas to the convection section. It should also not be ruled out that both measures, blanketing of convection section walls or wall regions and combustion at an enhanced pressure level, are accomplished in combination.

Heat is recovered from the reformate exiting the plurality of catalyst-containing reformer tubes thereby cooling the reformate 32. The step of recovering heat from the reformate from the plurality of catalyst-containing reformer tubes may comprise exchanging heat by indirect heat exchange between the reformate 32 and feed water 34 to form steam 36 from the feed water. The reformate 12 may be passed to heat exchanger 30 which is part of a steam making loop with a steam drum (not shown).

The cooled reformate 32 is reacted in the presence of a shift catalyst under reaction conditions sufficient to shift the reformate to form additional $H_2$ in the reformate 42. Reformate from the plurality of catalyst-containing reformer tubes that has been cooled in heat exchanger 30 is passed to water-gas shift reactor 40 to shift the reformate and form additional $H_2$. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst.

Any suitable shift catalyst may be used. The shift reactor may be a so-called high temperature shift (HTS), low temperature shift (LTS), medium temperature shift (MTS), or combination. Since the article "a" means "one or more," one or more shift reactors may be used in the process.

For high temperature shift, an inlet temperature in the range 310° C. to 370° C., and an outlet temperature in the range 400° C. to 460° C. is typical. Usually an iron oxide/chromia catalyst is used for high temperature shift.

For low temperature shift, an inlet temperature in the range 190° C. to 230° C., and an outlet temperature in the range 220° to 250° C. is typical. Usually a catalyst comprising metallic copper, zinc oxide, and one or more other difficulty reducible oxides such as alumina or chromia is used for low temperature shift For medium temperature shift, an inlet temperature in the range 190° C. to 230° C. and an outlet temperature of up to 350° C. is typical. A suitably formulated supported copper catalyst can be used for medium temperature shift.

A combination may include a sequence of high temperature shift, cooling by indirect heat exchange, and low temperature shift. If desired, either shift stage can be subdivided with inter-bed cooling.

Heat from the shifted reformate is recovered thereby cooling the shifted reformate 42. Heat may be recovered in a cooling train 44, which may include heat exchangers for preheating feed, boiler feed water, deaerator feed water, as well as additional cooling of the reformate 42 by heat exchange with air or cooling water. The reformate 62 is cooled to a temperature where water condenses.

$H_2O$ from the shifted reformate is removed to form a water-depleted reformate 64 comprising $H_2$ and secondary gas components. Condensate 38 may be removed in knock-out drum 45 as shown in the FIGURE. Water may be removed by any known means, for example, using desiccants, and/or thermal swing adsorption.

The water-depleted reformate 64 is separated by pressure swing adsorption in a plurality of at least 3 pressure swing adsorption beds 70. Each adsorption bed contains an adsorbent selective for the secondary gas components (i.e. CO and $CH_4$) thereby forming $H_2$ product 72 and pressure swing adsorption tail gas 76. The tail gas is the combination of all streams other than the hydrogen product 72. The hydrogen product may have a hydrogen concentration from 98 vol. % to 99.999 vol. % hydrogen.

Pressure swing adsorption for separating $H_2$ from reformate is well-known. Any suitable pressure swing adsorber system and pressure swing adsorption cycle may be used.

The one or more fuel gases 74 comprise at least a portion of the pressure swing adsorption tail gas 76. The pressure swing adsorption tail gas may be passed to a nitrogen rejection unit to remove nitrogen from the tail gas prior to introducing the tail gas as the one or more fuel gases into the radiant section of the reformer furnace.

The one or more fuel gases 74 may also comprise a supplemental fuel 18, also called trim fuel. The supplemental fuel may be natural gas or refinery off gas. The tail gas stream 76 and the supplemental fuel 18 may be introduced together or separately. Typically, the tail gas and supplemental fuel are sent as separate fuel streams to the reformer burner designed for segregated fuel feeds.

The combustion products for the one or more fuel gases are $CO_2$ and $H_2O$. As such, the combustion product gas 109 composition comprises mostly $CO_2$, $H_2O$ and small amounts of $O_2$, Ar, and $N_2$. After the $H_2O$ is condensed from the combustion product gas, the high concentration of $CO_2$ of about 90 to 98 volume % is suitable for enhanced oil recovery (EOR) and/or $CO_2$ sequestration applications. The $N_2$ and Ar inert gases are generally not a problem for these applications, however the $O_2$ should be removed.

The oxidant gas mixture 54 may be heated prior to introducing the oxidant gas mixture 54 into the radiant section of the reformer furnace, similar to conventional air pre-heaters used for ambient air. The oxidant gas mixture may be passed to heat exchanger 77 in the convection section of the reformer furnace to be heated by indirect heat transfer with the combustion product gas 109 thereby recovering heat from the combustion product gas 109.

The preheat temperature of the oxidant gas mixture may be dictated by steam export requirements and plant heat integration considerations.

The reactants 10 may also be heated by the combustion product gas 109 in the convection section of the reformer by indirect heat exchange between the combustion product gas 109 and the reactants 10. The reactants may be passed to heat exchange tubes 75 in the convection section of the reformer furnace to be heated by the combustion product gas 109.

As stated above, the reactants 10 may be a prereformed mixture. A prereformed mixture is formed by introducing steam and a hydrocarbon feed into a reactor (not shown), commonly referred to as a prereformer, and reacting the steam and the hydrocarbon feed in the presence of a reforming catalyst (also called prereforming catalyst) under reaction conditions sufficient to react a portion of the steam and the hydrocarbon feed.

Typically the prereformed effluent is withdrawn from the prereformer and heated by indirect heat exchange with combustion product gases in the convection section of the reformer.

The hydrocarbon feed to the prereformer may be formed by passing a hydrocarbon feedstock to a nitrogen rejection unit to remove nitrogen from the hydrocarbon feedstock thereby forming the hydrocarbon feed introduced into the prereformer.

We claim:

1. A process for producing a $H_2$ product gas and a $CO_2$ product gas, the process comprising:
   introducing reactants comprising steam and methane into a plurality of catalyst-containing reformer tubes in a radiant section of a reformer furnace, reacting the reactants in the presence of a reforming catalyst inside the plurality of catalyst-containing reformer tubes under reaction conditions sufficient to form a reformate comprising $H_2$, CO and steam, and withdrawing the reformate from the plurality of catalyst-containing reformer tubes, wherein the reformer furnace has the radiant section and a convection section, wherein the radiant section contains the plurality of catalyst-containing reformer tubes and the convection section contains heat exchange tubes;
   introducing one or more fuel gases and an oxidant gas mixture into the radiant section of the reformer furnace external to the plurality of catalyst-containing reformer tubes, wherein the oxidant gas mixture comprises 20 volume % to 35 volume % oxygen on a wet basis, combusting the one or more fuel gases with the oxygen in the oxidant gas mixture in the radiant section of the reformer furnace external to the plurality of catalyst-containing reformer tubes thereby forming a combustion product gas and supplying energy for reacting the reactants inside the plurality of catalyst-containing reformer tubes, passing the combustion product gas from the radiant section of the reformer to the convection section of the reformer, and withdrawing the combustion product gas from the convection section of the reformer furnace;
   recycling a first portion of the combustion product gas withdrawn from the convection section of the reformer furnace to the radiant section of the reformer furnace in the oxidant gas mixture, wherein 40 to 60% on a mass flow rate basis, of the combustion product gas withdrawn from the convection section of the reformer furnace is recycled as the first portion of the combustion product gas;
   reacting residual $O_2$ in a second portion of the combustion product gas with at least one of $H_2$ and $CH_4$ in the presence of a catalyst thereby decreasing the $O_2$ concentration in the second portion of the combustion product gas to below 10 ppmv;
   removing $H_2O$ from the second portion of the combustion product gas thereby forming the $CO_2$ product gas;
   recovering heat from the reformate from the plurality of catalyst-containing reformer tubes thereby cooling the reformate;
   reacting the cooled reformate in the presence of a shift catalyst under reaction conditions sufficient to shift the reformate to form additional $H_2$ in the reformate;
   recovering heat from the shifted reformate thereby cooling the shifted reformate;
   removing $H_2O$ from the shifted reformate to form a water-depleted reformate comprising $H_2$ and secondary gas components; and
   separating the water-depleted reformate in a plurality of at least 3 pressure swing adsorption beds, each adsorption bed containing an adsorbent selective for the secondary gas components thereby forming a $H_2$ product and a pressure swing adsorption tail gas;
   wherein the one or more fuel gases comprise at least a portion of the pressure swing adsorption tail gas; and
   wherein, to prevent leakage of air into the convection section, a third portion of the combustion product gas is recycled to the convection section of the reformer furnace by infiltration through one or more convection section walls and/or the one or more fuel gases are combusted with the oxygen in the oxidant gas mixture in the radiant section of the reformer furnace external to the plurality of catalyst-containing reformer tubes at a pressure ranging from 102.5 kPa to 116.3 kPa (absolute)

thereby forming the combustion product gas and supplying energy for reacting the reactants inside the plurality of the catalyst-containing reformer tubes.

2. The process of claim 1 wherein the one or more fuel gases comprise a supplemental fuel.

3. The process of claim 1 wherein the step of recycling the third portion of the combustion product gas to the convection section of the reformer comprises passing the third portion of the combustion product gas to a space between a jacket and the one or more convection section walls for infiltration of the third portion of the combustion product gas through one or more openings in the one or more convection section walls.

4. The process of claim 3 further comprising at least one of:
blending the first portion of the combustion product gas with industrial grade oxygen to form the oxidant gas mixture; and
recovering heat from the combustion product gas in the convection section by indirect heat exchange between the combustion product gas and the oxidant gas mixture prior to introducing the oxidant gas mixture into the radiant section of the reformer furnace.

5. The process of claim 4 further comprising recovering heat from the combustion product gas in the convection section by indirect heat exchange between the combustion product gas and the reactants.

6. The process of claim 5 further comprising:
introducing steam and a hydrocarbon feed into a first reactor, reacting the steam and the hydrocarbon feed in the presence of a second reforming catalyst under reaction conditions sufficient to react a portion of the steam and the hydrocarbon feed, and withdrawing an effluent from the first reactor; and
recovering heat from the combustion product gas in the convection section by indirect heat exchange between the combustion product gas and the effluent from the first reactor thereby heating the effluent from the first reactor;
wherein the reactants introduced into the plurality of catalyst-containing reformer tubes comprise the heated effluent from the first reactor.

7. The process of claim 6 further comprising:
passing a hydrocarbon feedstock to a nitrogen rejection unit to remove nitrogen from the hydrocarbon feedstock;
blending steam with the nitrogen-depleted hydrocarbon feedstock to form the reactants comprising steam and methane introduced into the plurality of catalyst-containing tubes.

8. The process of claim 7 further comprising:
passing at least a portion of the pressure swing adsorption tail gas to a nitrogen rejection unit to remove nitrogen from the pressure swing adsorption tail gas prior to introducing the at least a portion of the pressure swing adsorption tail gas as the one or more fuel gases or as at least a portion of the one or more fuel gases into the radiant section of the reformer furnace.

9. The process of claim 1 further comprising at least one of:
blending the first portion of the combustion product gas with industrial grade oxygen to form the oxidant gas mixture; and
recovering heat from the combustion product gas in the convection section by indirect heat exchange between the combustion product gas and the oxidant gas mixture prior to introducing the oxidant gas mixture into the radiant section of the reformer furnace.

10. The process of claim 1 further comprising recovering heat from the combustion product gas in the convection section by indirect heat exchange between the combustion product gas and the reactants.

11. The process of claim 1 further comprising:
introducing steam and a hydrocarbon feed into a first reactor, reacting the steam and the hydrocarbon feed in the presence of a second reforming catalyst under reaction conditions sufficient to react a portion of the steam and the hydrocarbon feed, and withdrawing an effluent from the first reactor; and
recovering heat from the combustion product gas in the convection section by indirect heat exchange between the combustion product gas and the effluent from the first reactor thereby heating the effluent from the first reactor;
wherein the reactants introduced into the plurality of catalyst-containing reformer tubes comprise the heated effluent from the first reactor.

12. The process of claim 11 further comprising:
passing a hydrocarbon feedstock to a nitrogen rejection unit to remove nitrogen from the hydrocarbon feedstock thereby forming the hydrocarbon feed introduced into the first reactor.

13. The process of claim 1 further comprising:
passing a hydrocarbon feedstock to a nitrogen rejection unit to remove nitrogen from the hydrocarbon feedstock;
blending steam with the nitrogen-depleted hydrocarbon feedstock to form the reactants comprising steam and methane introduced into the plurality of catalyst-containing tubes.

14. The process of claim 1 further comprising:
passing at least a portion of the pressure swing adsorption tail gas to a nitrogen rejection unit to remove nitrogen from the pressure swing adsorption tail gas prior to introducing the at least a portion of the pressure swing adsorption tail gas as the one or more fuel gases or as at least a portion of the one or more fuel gases into the radiant section of the reformer furnace.

15. The process of claim 1 wherein the oxidant gas mixture further comprises imported $CO_2$.

16. The process of claim 1 wherein the oxidant gas mixture is introduced at an oxygen molar flow rate that is 1 to 5% in excess of that required for complete combustion of the one or more fuel gases.

17. The process of claim 13 wherein the reformate is cooled by heat exchange with feed water thereby forming the steam from the feed water.

18. The process of claim 1 wherein the at least one of $H_2$ and $CH_4$ for reacting the residual $O_2$ in the second portion of the combustion product gas is provided by at least one of the $H_2$ product, a portion of the pressure swing adsorption tail gas, and a supplemental fuel.

19. The process of claim 1 wherein the oxidant gas mixture comprises 20 volume to 35 volume % oxygen and 15 volume % to 50 volume % $CO_2$ on a wet basis, wherein at least essentially all of the $CO_2$ is delivered by the first portion of the combustion product gas.

20. The process of claim 1 wherein the oxidant gas mixture contains less than 5 volume % inerts including $N_2$ and any noble gas.

* * * * *